(12) United States Patent
Muljono et al.

(10) Patent No.: US 9,602,160 B2
(45) Date of Patent: Mar. 21, 2017

(54) APPARATUS AND METHOD FOR DIGITALLY CANCELLING CROSSTALK

(71) Applicant: Intel Corporation, Santa Clara, CA (US)

(72) Inventors: Harry Muljono, San Ramon, CA (US); Changhong Lin, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/521,961

(22) Filed: Oct. 23, 2014

(65) Prior Publication Data

US 2016/0119024 A1    Apr. 28, 2016

(51) Int. Cl.
| | | |
|---|---|---|
| *H04B 3/32* | (2006.01) | |
| *H04J 1/12* | (2006.01) | |
| *H04J 3/10* | (2006.01) | |
| *G06F 13/40* | (2006.01) | |
| *H04L 25/14* | (2006.01) | |

(52) U.S. Cl.
CPC ............ *H04B 3/32* (2013.01); *G06F 13/40* (2013.01); *H04J 1/12* (2013.01); *H04J 3/10* (2013.01); *H04L 25/14* (2013.01)

(58) Field of Classification Search
USPC ........................................................ 370/201
See application file for complete search history.

(56) References Cited

U.S. PATENT DOCUMENTS

| | | |
|---|---|---|
| 7,549,134 B1 | 6/2009 | Li et al. |
| 8,493,833 B1 | 7/2013 | Zhang et al. |
| 2002/0008561 A1* | 1/2002 | Lin ................. H01L 23/5222 327/296 |
| 2004/0022311 A1* | 2/2004 | Zerbe .............. H04L 25/03038 375/229 |
| 2008/0100367 A1 | 5/2008 | Hossain |
| 2010/0329403 A1* | 12/2010 | Beukema .......... H03K 5/15013 375/356 |

OTHER PUBLICATIONS

International Search Report and Written Opinion for International Patent Application No. PCT/US2015/044342, mailed on Nov. 18, 2015, 14 pages.
Buckwalter et al., "Cancellation of cross-talk induced jitter," IEEE Journal of Solid-State Circuits, vol. 41, No. 3, Mar. 2006, pp. 621-632.
Non-Final Office Action, mailed Jul. 13, 2016, for TW Patent Application No. 104130608.
Buckwalter, F. et al., "Cancellation of Crosstalk-Induced Jitter", IEEE Journal of Solid-State Circuits, vol. 41, No. 3, Mar. 2006.
Notice of Allowance mailed Nov. 28, 2016 for Taiwanese Patent Application No. 104130608.

* cited by examiner

*Primary Examiner* — Mohammad Anwar
*Assistant Examiner* — Kokou R Detse
(74) *Attorney, Agent, or Firm* — Green, Howard & Mughal, LLP

(57) ABSTRACT

Described is an apparatus which comprises: a first buffer to receive a first signal from a first transmission media; a second buffer to receive a second signal from a second transmission media separate from the first transmission media; a first summing node coupled to the first buffer, the first summing node to receive output of the first buffer; and a first digital adjustment circuit which is operable to drive a first adjustment signal to the first summing node when a transition edge of the second signal is detected.

20 Claims, 5 Drawing Sheets

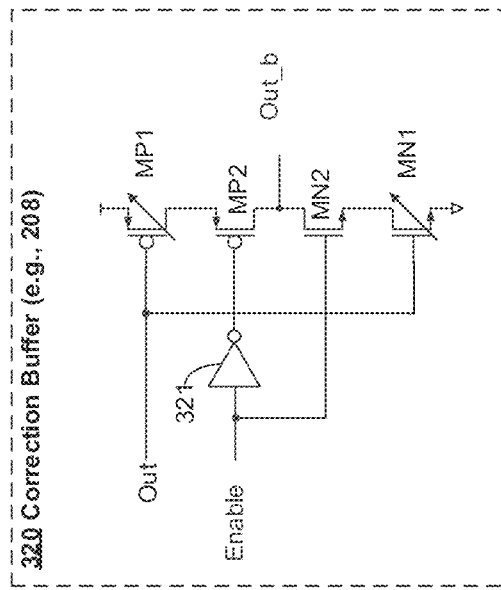
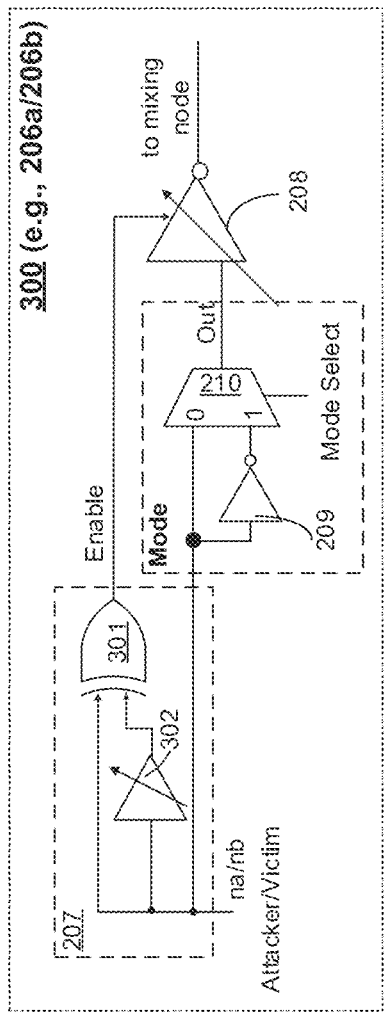
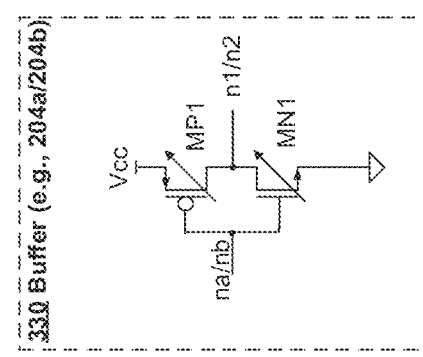
Fig. 3A
Fig. 3B
Fig. 3C

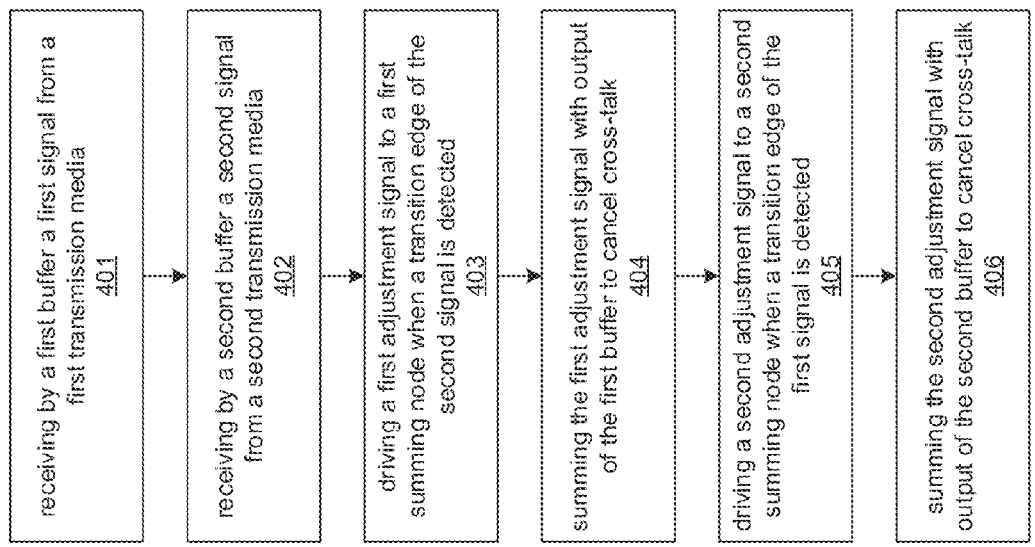

APPARATUS AND METHOD FOR DIGITALLY CANCELLING CROSSTALK

BACKGROUND

To increase data bandwidth, parallel transceivers are used in data communications. When spacing between parallel channels is narrow and the data rate on those channels is high, crosstalk noise is induced at the receiver (Rx) end. This crosstalk noise is called Far End Crosstalk (FEXT). Channel or interconnect crosstalk is a dominant noise source that degrades signal margin in input-output (I/O) interfaces such as 3200 Mega Transfers (MTs), Double Data Rate 4 (DDR4), and 4267MTs Low Power DD44 (LPDDR4), where DDR4 and LPDDR4 are described by the Joint Electron Device Council (JEDEC) Solid State Technology Association. The cancellation of FEXT is challenging to accomplish for low power devices due to analog circuit design complexity and high power consumption.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 3A illustrates apparatus for crosstalk detection and correction, according to some embodiments of the disclosure.

FIG. 3B illustrates a correction buffer used in FIG. 3A, according to some embodiments of the disclosure.

FIG. 3C illustrates a victim buffer.

FIG. 4 illustrates a flowchart of a method to cancel or reduce crosstalk using the digital apparatus for crosstalk cancellation, according to some embodiments of the disclosure.

DETAILED DESCRIPTION

Figure 1:
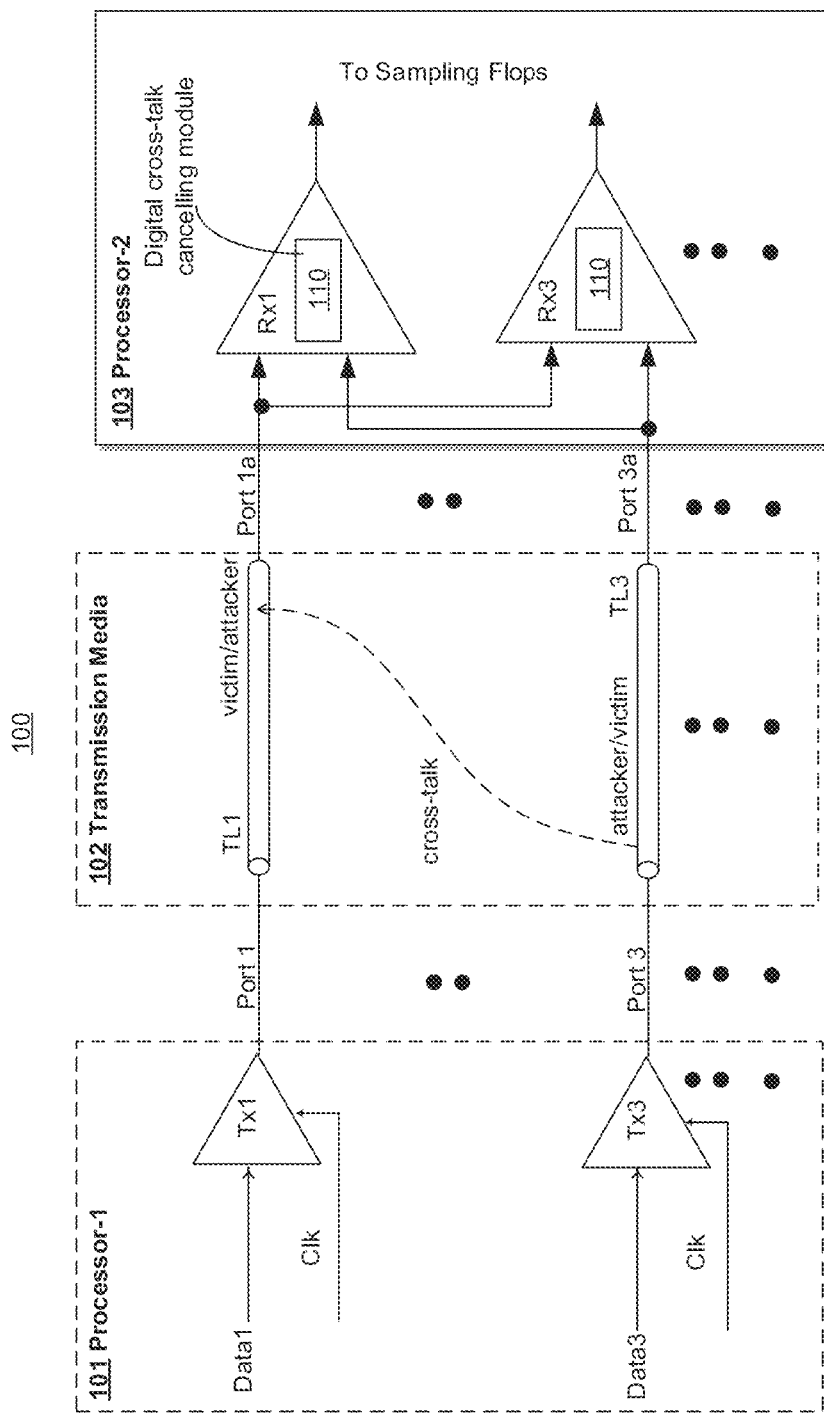
FIG. 1 illustrates a system having digital crosstalk cancelling apparatus, according to some embodiments of the disclosure.

Some method and apparatus for cancelling FEXT resorts to analog filtering circuitry that extracts the aggressor's FEXT contribution and proportionally removes it from the victim signal. For example, the aggressor signal passes through a differentiator (or high pass filter) at the Rx to emulate the channel inductive coupling effect. This emulation process results in generating an artificially recreated signal which is an inverse version of the FEXT and is summed to a victim lane signal to generate a FEXT-free signal at the summer output. However, cost of such analog implementation is high because of high power consumption and high performance connection between the high-speed aggressor and the victim signal, which are often located far from each other on silicon (e.g., adjacent package/board routing does not necessarily map to adjacent blocks on the silicon). Scaling the recreated signal requires complex precision analog circuits to perform signal summation with high-fidelity.

For a single-ended interface, such as DDR (Double Data Rate), FEXT degrades timing margin rather than voltage margin. In some embodiments, an apparatus is described which regains this lost timing margin by performing timing adjustment (e.g., pull-in or push-out) of the victim signal edge transition based on the aggressor signals' edge transition. In some embodiments, the apparatus includes circuits that first detect the polarity of crosstalk, and then cancel the jitter. In some embodiments, this cancellation of crosstalk is implemented using all digital circuits with Complementary Metal Oxide Semiconductor (CMOS) level signaling.

There are many technical effects of the embodiments. For example, the cross-coupled apparatus for cancelling FEXT comprises digital circuits that consume substantially less energy than traditional high precession analog circuits used for cancelling FEXT. This makes the apparatus of some embodiments more useable for low power devices than traditional analog circuits because typical analog circuits for such purpose use multi-sampling and high-speed post processing logic. The circuits being digital in nature also scale well with process nodes compared to analog circuits that require a complete redesign with any shift in process parameters. The cross-coupled apparatus of various embodiments widens the eye width of an eye diagram without the expense of high power analog circuits.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences may actually comprise one or more signals that may travel in either direction and may be implemented with any suitable type of signal scheme.

Throughout the specification, and in the claims, the term "connected" means a direct electrical or wireless connection between the things that are connected, without any intermediary devices. The term "coupled" means either a direct electrical or wireless connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms}

"substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits and logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates a system 100 having digital crosstalk cancelling apparatus, according to some embodiments of the disclosure. In some embodiments, system 100 comprises Processor-1 101 (e.g., memory controller, graphics processor, general processor, digital signal processor, etc.), Transmission Media 102 (e.g., on-die or off-die interconnect, transmission lines, etc.), and Processor-2 103 (e.g., Dynamic Random Access Memory (DRAM), or any other processor) having apparatus for cancelling FEXT or other types of crosstalk. In some embodiments, Transmission Media 102 may be a cable with tightly packed wires such that data on one wire may cause noise on data being carried by other wires within the packet. In some embodiments, Transmission Media 102 is a parallel bus with closely spaced interconnects.

In some embodiments, Processor-1 101 comprises many circuits including transmitters (Tx) that drive data on Transmission Media 102 to Processor-2 102. In this example, three transmitters—Tx1 to Tx3—are shown that receive respective data—Data1 to Data3—as inputs and transmit those data over respective ports—Port1 to Port 3—to Transmission Media 102. While various embodiments are described with reference to three transmitters, receivers, and transmission lines, any number of them can be used.

Each Tx may clock data using clock signal Clk before transmitting the data onto their respective ports. In this example, Transmission Media 102 is shown with three transmission lines (TL)—TL1 to TL3. One end of the TLs are coupled to output ports of Tx of Processor-1 101 and the other end of TLs are coupled to input ports of receivers (Rx) of Processor-2 103. For example, TL1 is coupled on one end to Port1 and at another end to Port1$a$; TL2 (not shown) is coupled on one end to Port2 (not shown) and at another end to Port2$a$; and TL3 is coupled on one end to Port3 and at another end to Port3$a$, and so on.

Processor-2 103 includes receivers that receive data transmitted by transmitters. In this example, three receivers are shown—Rx1 to Rx3—that receive data from respective input ports. In some embodiments, each receiver also receives data from neighboring receivers. For example, Rx1 receives data from Port1$a$ and Port3$a$ so that it may cancel crosstalk on data on either ports caused by an attacker on either Port1$a$ or Port3$a$. In this example, when data on TL3 induces FEXT on data on TL1, data on TL3 is considered the attacker and data on TL1 is considered a victim, and vice versa. In some embodiments, each receiver includes digital crosstalk cancelling apparatus (or module) 110. In some embodiments, after cancelling crosstalk on data at the inputs of the receivers, crosstalk free (or crosstalk reduced) data is then sent to sampling flops (or sequential logic) for further processing.

As mentioned above, for a single-ended interface such as DDR, FEXT, to the first order, degrades timing margin rather than voltage margin. Crosstalk induced timing margin degradation can be derived in terms of transmission lines' self and mutual inductance L and capacitance C. Time-of-Flight (TOF) of a signal (transition) can be determined by a nominal time T (i.e., without crosstalk interference), and an additional component due to even or odd mode crosstalk. Sign or polarity of the crosstalk jitter can be determined by the transmission line characteristic, or whether the line is dominated by mutual inductance L or capacitance C, referred as inductive or capacitive crosstalk respectively. For DDR interface, this additional jitter term can be cancelled using delay compensation circuits according to some embodiments. In some embodiments, the apparatus regains this lost timing margin by performing timing adjustment (e.g., pull-in or push-out) of the victim signal edge transition based on the aggressor's transition by first detecting the polarity of crosstalk, and then cancelling the jitter.

The amount of crosstalk jitter that is subtracted from the victim signal at the summing node can be derived as follows:

$$TOF\_even = l\sqrt{(L_s - L_m)(C_s - C_m)}$$

$$TOF\_odd = l\sqrt{(L_s + L_m)(C_s - C_m)}$$

$$TOF\_e/o = T \pm \frac{l}{2}(L_m/Z_0 - C_m Z_0);$$

$$Z_0 = \sqrt{L_s/C_s}$$

$$T = l\sqrt{l_s C_s - L_m C_m}$$

$$xtalk\_jitter = \pm \frac{l}{2}(L_m/Z_0 - C_m Z_0)$$

where "$L_s$" is self inductance of transmission line, "$L_m$" is mutual inductance of transmission line, "$Z_o$" is characteristic impedance of the transmission line, "$C_s$" is self induced capacitance, "$C_m$" is mutually induced capacitance, '1' is length of transmission line, "TOF_even" is the time-of-flight (or propagation delay) for a transmission line when the transition edges of the aggressor and victim data have the same polarity, "TOF_odd" is the time-of-flight for a transmission line when the transition edges of the aggressor and victim data have opposite polarities, "TOF_e/o" is the time of flight for a victim signal with even/odd FEXT, and "xtalk_jitter" is crosstalk jitter which shows that the jitter is a timing event and is an amount which is added or subtracted at the receiver end to compensate the crosstalk effect. Compensation polarity can be determined a priori by the characteristic of the physical interconnect. For example, it can be determined by pre-silicon or post-silicon debug whether the interconnects are inductive dominant or capacitance dominant (i.e., inductive when $L_m/Z_o > C_m Z_o$; capacitive when $L_m/Z_o < C_m Z_o$).

Figure 2:
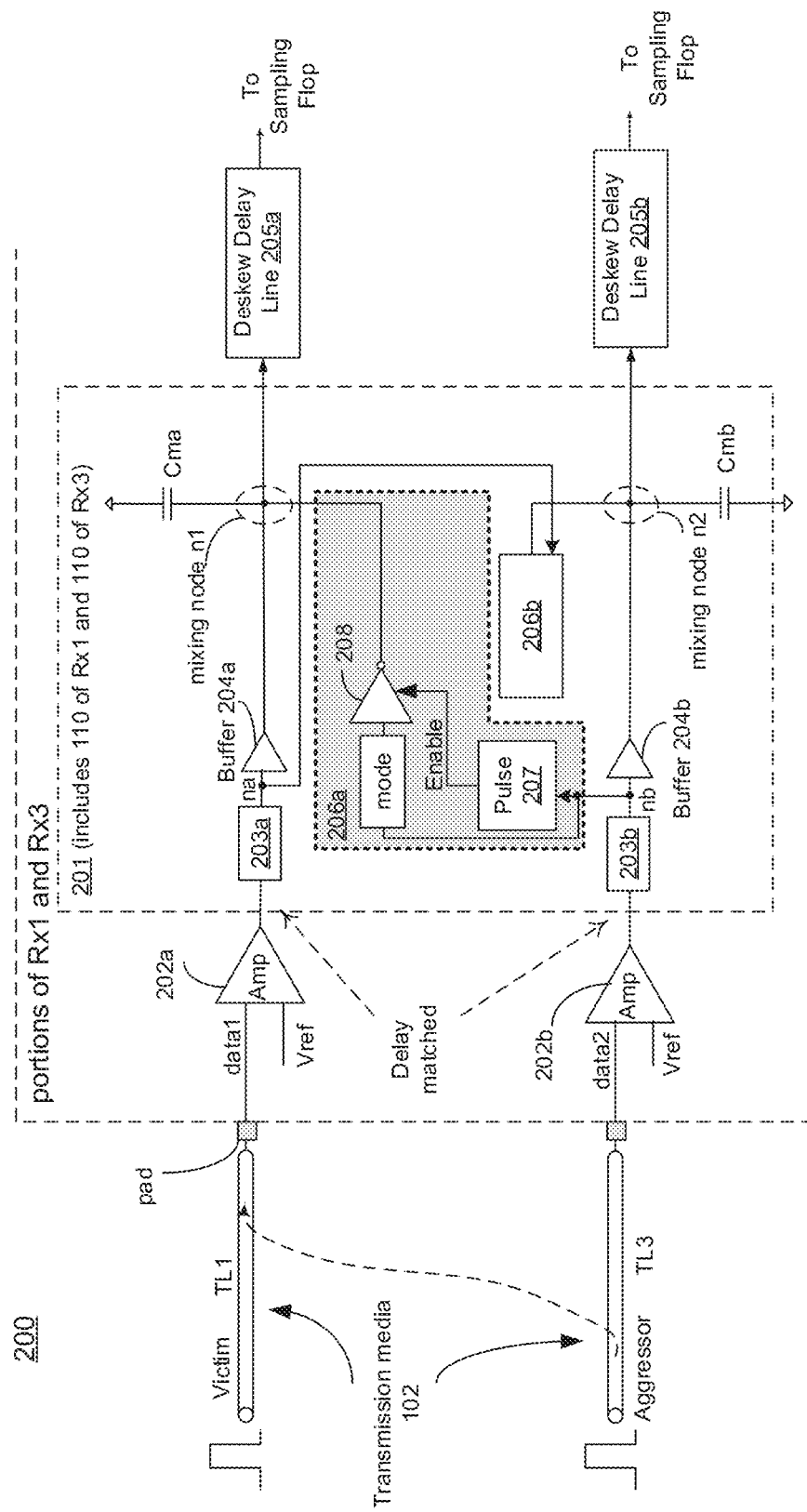
FIG. 2 illustrates the digital apparatus for crosstalk cancellation, according to some embodiments of the disclosure.

FIG. 2 illustrates a portion 200 of system 100 having digital apparatus 201 (which includes 110 of Rx1 and 110 of Rx3) for crosstalk cancellation, according to some embodiments of the disclosure. It is pointed out that those elements of FIG. 2 having the same reference numbers (or names) as the elements of any other figure can operate or function in any manner similar to that described, but are not limited to such.

In some embodiments, portion 200 comprises input amplifiers (Amp) and digital apparatus 201. In this example, Amp 202a is part of Rx1 while Amp 202b is part of Rx3. In some embodiments, digital apparatus 201 comprises delay matched buffers 203a and 203b, Victim/Aggressor Buffers 204a and 204b, Deskew Delay Lines 205a and 205b, capacitive devices Cma and Cmb, and cross-coupled crosstalk detectors and correctors 206a and 206b coupled together as shown.

As discussed with reference to FIG. 1, each Rx receives at least two inputs—one from a TL driven by a corresponding Tx and another from a neighboring TL, which is driven by another Tx. In this example, TL3 is the aggressor and TL1 is the victim (i.e., data transmitted on TL3 is the aggressor data, and data transmitted on TL1 is the victim data).

Referring back to FIG. 2, victim data (i.e., data1) is received by Amp 202a, which compares data1 with a reference voltage (Vref). The output of Amp 202a is received by delay buffer 203a which delays the output of Amp 202a and provides it to node na. Here, labels for nodes and signals are interchangeably used. For example, "na" may refer to node na or signal na depending on the context of the sentence.

The signal on node na is then buffered by Buffer 204a (also referred to here as Victim Buffer). In some embodiments, output of Buffer 204a is provided to mixing node n1 (also referred here as the first summing node). Aggressor data (i.e., data2) is received by Amp 202b, which compares data2 with Vref. The output of Amp 202b is received by delay buffer 203b, which delays the output of Amp 202b and provides it to node nb. In some embodiments, delay buffers 203a and 203b have matched delays (i.e., substantially equal propagation delays). The signal on node nb is then buffered by Buffer 204b (also referred here as the Aggressor Buffer). In some embodiments, output of Buffer 204b is provided to mixing node n2 (also referred to here as the second summing node). Signals on mixing nodes n1 and n2 are then provided to Deskew Delay Lines 205a and 205b, respectively. Deskew Delay Lines 205a and 205b may be used to realign data on mixing nodes n1 and n2 relative to a clock signal for subsequent sampling by downstream sequential logic (not shown).

In some embodiments, cross-coupled crosstalk detectors and correctors 206a and 206b are used to cancel or reduce crosstalk on data1 and/or data2 (depending on which one is the aggressor and victim) by subtracting or adding signals on mixing nodes n1 and n2. In some embodiments, crosstalk detector and corrector 206a (i.e., crosstalk detector and corrector 110 of Rx1) comprises Pulse Generator 207, Correction Buffer 208, and Mode logic. In some embodiments, crosstalk detector and corrector 206b (i.e., crosstalk detector and corrector 110 of Rx3) has the same design as crosstalk detector and corrector 206a but with different inputs.

For example, crosstalk detector and corrector 206a receives input on node nb and provides an output which is summed at mixing node n1 while crosstalk detector and corrector 206b receives input on node na and provides an output which is summed at mixing node n2. So as not to obscure the embodiments, crosstalk detector and corrector 206a is described, and similar explanation is applicable for crosstalk detector and corrector 206b.

In some embodiments, Pulse Generator 207 provides an enable/disable pulse to Correction Buffer 208. In some embodiments, Correction Buffer 208 receives input on node nb (i.e., the aggressor signal) and generates an output for summing on the mixing node n1 when Pulse Generator 207 identifies the transition edge of the signal on node nb. In some embodiments, the pulse width of the pulse generated by Pulse Generator 207 is programmable and/or adjustable to cause Correction Buffer 208 to turn on (i.e., become enabled) when the aggressor signal is transitioning. In some embodiments, capacitive devices Cma and Cmb are coupled to mixing nodes n1 and n2, respectively, to improve the process of summing or mixing induced delay adjustment. In some embodiments, capacitive devices Cma and Cmb are metal capacitors. In some embodiments, capacitive devices Cma and Cmb are implemented as transistors. In some embodiments, capacitive devices Cma and Cmb are implemented as hybrid capacitors (i.e., a mix of metal capacitors and transistors).

In some embodiments, Correction Buffer 208 is enabled during an attacker's edge transition. In some embodiments, the strength of Correction Buffer 208 is programmable to proportionally control the timing adjustment through the capacitive device Cma at the mixing node n1. In some embodiments, through training or careful adjustment of the capacitive device Cma, the delay adjustment provided by the mixing scheme can fully cancel the crosstalk induced jitter.

In some embodiments, when the nature of crosstalk is known (i.e., whether the crosstalk is capacitive dominated or inductive dominated crosstalk), the polarity of the output of crosstalk detector and corrector 206a (and 206b) can be determined. For example, when both the aggressor and victim signals (i.e., data2 and data1, respectively) transition in the same direction (i.e., both transition from high to low or low to high), then the mode is an even mode. In inductive crosstalk, even mode crosstalk slows down the propagation of a signal transition, while odd mode crosstalk speeds up propagation of a signal transition. In capacitive crosstalk, even mode crosstalk speeds up the propagation of a signal transition, while odd mode crosstalk slows down the propagation.

In this example, a Mode Select signal (shown with reference to FIG. 3A) is asserted (i.e., configured to logic high) to cause Mode logic to provide an inverted version of the signal on node na/nb as input to the Correction Buffer 208 which is designed to be an inverting buffer. Mode Select, indicates the coupling nature of the physical transmission media, (i.e., whether the physical transmission media is capacitive dominated or inductive dominated). In this case, the output of Correction Buffer 208 of crosstalk detector and corrector 206a is summed or mixed with the output of Buffer 204a on the mixing node n1 such that the victim signal at Buffer 204a output is sped up or slowed down in the reverse manner as the upstream inductive FEXT effect, achieving the cancellation result. Table 1 summarizes the output signal behavior of Correction Buffer 208 in crosstalk even/odd modes and in crosstalk inductive/capacitive modes.

TABLE 1

FEXT effect is summarized by the four cases

| | Even | Odd |
|---|---|---|
| Inductive | Slow down | Speed up |
| Capacitive | Speed up | Slow down |

FIG. 3A illustrates apparatus 300 (e.g., 206a/b) for crosstalk detection and correction, according to some embodiments of the disclosure. It is pointed out that those elements of FIG. 3A having the same reference numbers (or names) as the elements of any other figure can operate or function in any manner similar to that described, but are not limited to such.

In some embodiments, apparatus 300 comprises Pulse Generator 207, Mode logic, and Correction Buffer 208. In some embodiments, Pulse Generator 207 comprises an exclusive-OR logic gate (XOR) 301 coupled to variable delay buffer 302. The output of Pulse Generator 207 is an Enable signal that enables Correction Buffer 208. The XOR gate 301 compares the signal on node na/nb with a delayed version of that signal (i.e., delayed by variable delay buffer 302) to generate a pulse (i.e., Enable signal).

In some embodiments, by changing the propagation delay of variable buffer 302, the pulse width of the Enable signal can be adjusted. If the aggressor and victim transitions have a skew exceeding the propagation delay of buffer 302, crosstalk jitter diminishes. In such a case, there may be no need to activate or enable Correction Buffer 208. Propagation delay of buffer 302 for a DDR4 channel may be set around 50 ps. While the embodiments are described with reference to an XOR based Pulse Generator 207, other implementations of Pulse Generator 207 may be used without departing from the essence of some embodiments. In some embodiments, output of Correction Buffer 208 is received by mixing nodes n1/n2.

In some embodiments, Mode logic comprises Inverter 209 and Multiplexer 210. In some embodiments, input "Out" of Correction Buffer 208 is inverted depending on the Mode Select signal. For example, when the victim and aggressor signals on nodes na and nb, respectively, are in even mode, then Mode Select is asserted and Multiplexer 210 selects output of inverter 209 as Out signal (i.e., input of Correction Buffer 208).

In some embodiments, the Mode Select signal configures the circuit to work in either inductive or capacitive interconnection environment. In some embodiments, the Mode Select signal is a static control or configuration. In some embodiments, once configured by the Mode Select signal, the circuit handles the even/odd mode crosstalk signal automatically (i.e., no other control is used to dynamically detect the even/odd crosstalk).

In another example, when the victim and aggressor signals on nodes na and nb, respectively, are in odd mode, then Mode Select is de-asserted and Multiplexer 210 selects signals on node na/nb as Out signal (i.e., input of Correction Buffer 208). In some embodiments, the propagation delay of crosstalk detection and correction apparatus 300 is matched with the propagation delay of buffers 204a/204b.

FIG. 3B illustrates Correction Buffer 320 (e.g., 208) used in FIG. 3A, according to some embodiments of the disclosure. It is pointed out that those elements of FIG. 3B having the same reference numbers (or names) as the elements of any other figure can operate or function in any manner similar to that described, but are not limited to such.

In some embodiments, Correction Buffer 320 comprises p-type devices MP1 and MP2, n-type devices MN1 and MN2, and inverter 321 coupled together as shown. In some embodiments, signals on nodes na/nb are used to control gate terminals of MP1 and MN1. In some embodiments, the Enable signal and its inverted version are used to control the gate terminals of MN2 and MP2, respectively. In some embodiments, the input of Correction Buffer 320 is "Out" which is the output of Mode logic. The output of Correction Buffer 320 is Out_b, which in some embodiments is provided directly to the mixing node. In some embodiments, the strength of Correction Buffer 320, and hence the propagation delay, is adjustable by adding or subtracting transistors in parallel to MP1 and MN1.

Referring back to FIG. 2, in some embodiments, depending on the crosstalk mode, pull-up (or pull down) strength (or effective resistance R) of Buffers 204a and/or 204b is modulated to be weaker or stronger providing delay adjustment as the victim signal passes through.

FIG. 3C illustrates an example 330 of Buffers 204a/204b. In this example, Buffers 204a/204b comprise p-type transistors MP1 coupled in series with n-type transistors MN1 as shown. While example 330 shows one p-type transistor MP1 and one n-type transistor MN1, multiple transistors are coupled in parallel. For example, multiple p-type transistors are coupled in parallel to MP1 and are controllable by control signals (not shown).

Here, the gate terminals of MP1 and MN1 are coupled to nodes na/nb and drain terminals of MP1 and MN1 are coupled to nodes n1/n2. The source terminals of MP1 are coupled to power supply Vcc while the source terminals of MN1 are coupled to ground. In some embodiments, the pull-up (or pull down) strength (or effective resistance R) of the Buffers 204a/204b, and hence their propagation delay, is adjusted by turning on/off transistors (i.e., the parallel transistors coupled to MP1 and MN1). Referring back to FIG. 2, in some embodiments, Buffers 204a and/or 204b have matched propagation delays. In some embodiments, Buffers 204a and/or 204b have programmable and/or adjustable delays.

FIG. 4 illustrates a flowchart 400 of a method to cancel or reduce crosstalk using the digital apparatus for crosstalk cancellation, according to some embodiments of the disclosure. It is pointed out that those elements of FIG. 4 having the same reference numbers (or names) as the elements of any other figure can operate or function in any manner similar to that described, but are not limited to such.

Although the blocks in flowchart 400 with reference to FIG. 4 are shown in a particular order, the order of the actions can be modified. Thus, the illustrated embodiments can be performed in a different order, and some actions/blocks may be performed in parallel. Some of the blocks and/or operations listed in FIG. 4 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 401, a first buffer (e.g., Buffer 204a) receives a first signal (e.g., signal on node na). This first signal is received from a first transmission media (e.g., TL1 of Transmission Media 102) after being compared by Amp 202a and delayed by buffer 203a. At block 402, a second buffer (e.g., Buffer 204b) receives a second signal (e.g., signal on node nb). This second signal is received from a second transmission media (e.g., TL3 of Transmission Media 102) after being compared by Amp 202b and delayed by Buffer 203b.

At block 403, crosstalk detection and correction apparatus 206a generates a first adjustment signal (also referred here as the contention or auxiliary signal), which is driven on to the mixing node n1 (also referred here as the summing node) when Pulse Generator 207 of apparatus 206a detects transition edge of the second signal (i.e., signal on node nb). At block 404, the output of Buffer 204a is summed with the first adjustment signal to cancel crosstalk-timing jitter from the output of Buffer 204a.

At block 405, crosstalk detection and correction apparatus 206b generates a second adjustment signal, which is driven on to the mixing node n2 (also referred to here as the summing node) when Pulse Generator 207 of 206b detects transition edge of the first signal (i.e., signal on node na). At block 406, output of buffer 204b is summed with the second adjustment signal to cancel crosstalk from the output of buffer 204b. Subsequent downstream logic then processes the signals with cancelled crosstalk.

Supply noise-induced jitter may increase due to slow signal slope at the summing nodes n1 and 2. Also, the signals on the summing nodes n1 and n2 may experience "blips" (i.e., transient voltage/current droops or spikes) when the victim signal is DC during the transitions of the aggressor signal transitions due to the contention event. In some embodiments, the buffer (not shown) after nodes n1 and n2 are used to filter these blips.

Figure 5:
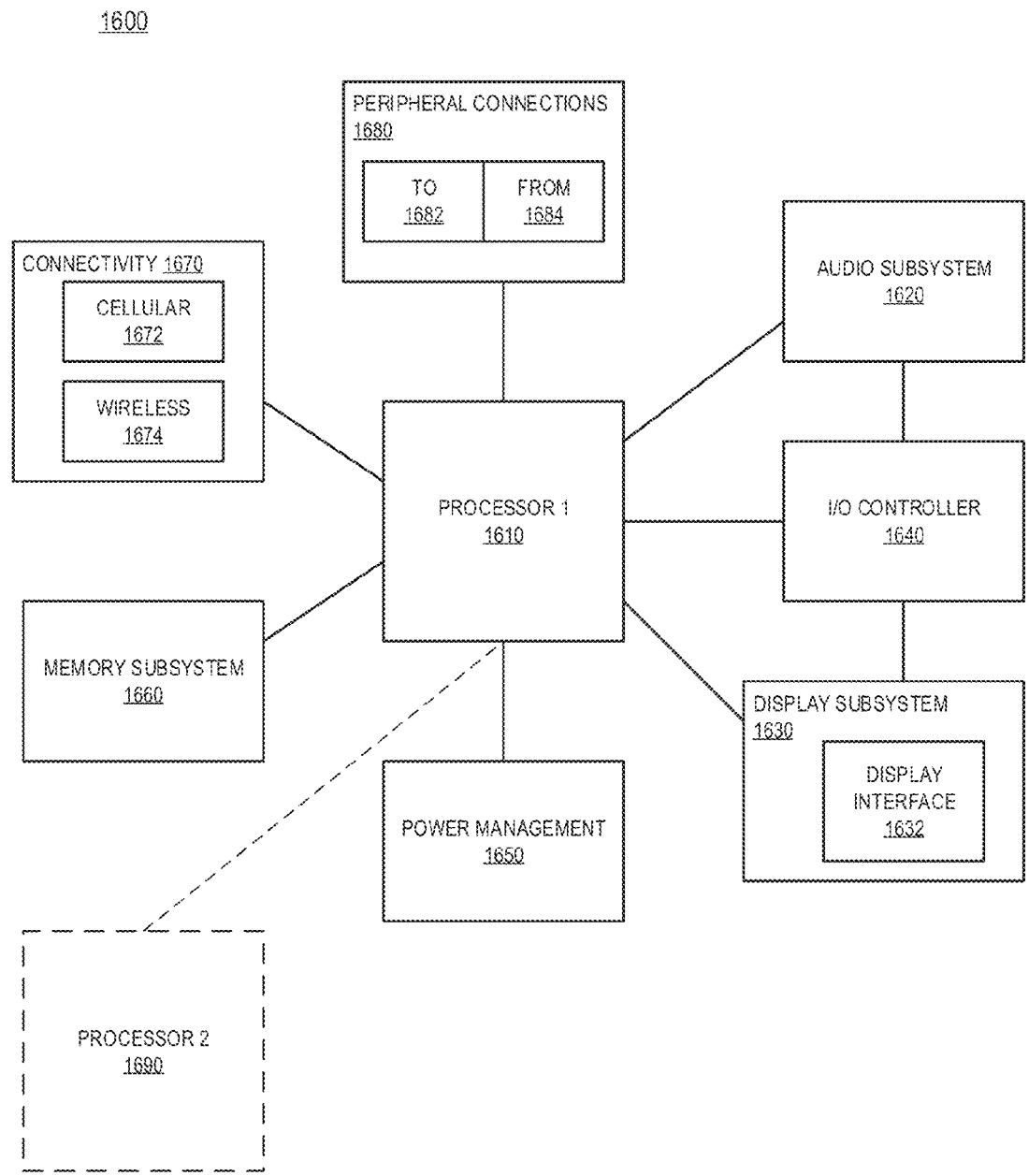
FIG. 5 illustrates a smart device or a computer system or a SoC (System-on-Chip) with digital crosstalk cancelling apparatus, according to some embodiments.

FIG. 5 illustrates a smart device or a computer system or a SoC (System-on-Chip) with digital crosstalk cancelling apparatus, according to some embodiments. It is pointed out that those elements of FIG. 5 having the same reference numbers (or names) as the elements of any other figure can operate or function in any manner similar to that described, but are not limited to such.

FIG. 5 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with digital crosstalk cancelling apparatus, according to some embodiments discussed. Other blocks of the computing device 1600 may also include the digital crosstalk cancelling apparatus of some embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS), which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a first buffer to receive a first signal from a first transmission media; a second buffer to receive a second signal from a second transmission media separate from the first transmission media; a first summing node coupled to the first buffer, the first summing node to receive output of the first buffer; and a first digital adjustment circuit which is operable to drive a first adjustment signal to the first summing node when a transition edge of the second signal is detected.

In some embodiments, the first buffer and the first digital adjustment circuit have substantially the same propagation delays. In some embodiments, the first digital adjustment circuit comprises: a pulse generator to receive the second signal and to generate a pulse; and a tri-stable buffer which is operable to buffer the second signal as the first adjustment signal according to a duration of the pulse. In some embodiments, the pulse generator has a programmable delay buffer.

In some embodiments, the apparatus comprises: a second summing node coupled to the second buffer, the second summing node to receive output of the second buffer. In some embodiments, the apparatus comprises: a second digital adjustment circuit which is operable to drive a second adjustment signal to the second summing node when a transition edge of the first signal is detected. In some embodiments, the apparatus comprises: a first capacitive device coupled to the first summing node; and a second capacitive device coupled to the second summing node.

In some embodiments, the second buffer and the second digital adjustment circuit have substantially the same propagation delays. In some embodiments, the second digital adjustment circuit comprises: a pulse generator to receive the first signal and to generate a pulse; and a tri-stable buffer which is operable to buffer the first signal as the second adjustment signal according to a duration of the pulse. In some embodiments, the pulse generator has a programmable delay buffer.

In another example, an apparatus is provided which comprises: a bus to provide first and second signals; and a pair of cross-coupled digital adjustment circuits which are operable to: drive a first adjustment signal to a first summing node when a transition edge of the second signal is detected, and drive a second adjustment signal to a second summing node when a transition edge of the first signal is detected. In some embodiments, one of the cross-coupled digital adjustment circuit comprises: a pulse generator to receive the second signal and to generate a pulse; and a tri-stable buffer which is operable to buffer the second signal as the first adjustment signal according to a duration of the pulse.

In some embodiments, another of the cross-coupled digital adjustment circuit comprises: a pulse generator to receive the first signal and to generate a pulse; and a tri-stable buffer which is operable to buffer the first signal as the second adjustment signal according to a duration of the pulse. In some embodiments, the apparatus comprises: a first buffer to receive the first signal from a first transmission media of the bus; and a second buffer to receive a second signal from a second transmission media of the bus, the second transmission media separate from the first transmission media.

In another example, a system is provided which comprises: a memory; a processor coupled to the memory by a bus having first and second transmission lines to provide first and second signals respectively, the processor including a receiver which comprises: a pair of cross-coupled digital adjustment circuits which are operable to: drive a first adjustment signal to a first summing node when a transition edge of the second signal is detected, and drive a second adjustment signal to a second summing node when a transition edge of the first signal is detected; and a wireless interface for allowing the processor to communicate with another device.

In some embodiments, the receiver is a Double Data Rate (DDR) compliant receiver. In some embodiments, one of the cross-coupled digital adjustment circuit comprises: a pulse generator to receive the second signal and to generate a pulse; and a tri-stable buffer which is operable to buffer the second signal as the first adjustment signal according to a duration of the pulse. In some embodiments, another of the cross-coupled digital adjustment circuit comprises: a pulse generator to receive the first signal and to generate a pulse; and a tri-stable buffer which is operable to buffer the first signal as the second adjustment signal according to a duration of the pulse. In some embodiments, the receiver comprises: a first buffer to receive the first signal from a first transmission media of the bus; and a second buffer to receive a second signal from a second transmission media of the bus, the second transmission media separate from the first transmission media. In some embodiments, the system further comprises a display interface for allowing a display unit to display content processed by the processor.

In another example, a method is provided which comprises: receiving first and second signals; driving a first adjustment signal to a first summing node when a transition edge of the second signal is detected, and driving a second adjustment signal to a second summing node when a transition edge of the first signal is detected. In some embodiments, the method comprises generating a pulse using the second signal. In some embodiments, the method comprises buffering the second signal as the first adjustment signal according to a duration of the pulse. In some embodiments, the method comprises generating a pulse using the first signal. In some embodiments, the method comprises: buffering the first signal as the second adjustment signal according to a duration of the pulse. In some embodiments, the method comprises: receiving the first signal from a first transmission media. In some embodiments, the method comprises: receiving the second signal from a second transmission media of the bus, the second transmission media being separate from the first transmission media.

In another example, an apparatus is provided which comprises: means for receiving first and second signals; means for driving a first adjustment signal to a first summing node when a transition edge of the second signal is detected, and means for driving a second adjustment signal to a second summing node when a transition edge of the first signal is detected. In some embodiments, the apparatus comprises: means for generating a pulse using the second signal. In some embodiments, the apparatus comprises: means for buffering the second signal as the first adjustment signal according to a duration of the pulse. In some embodiments, the apparatus comprises: means for generating a pulse using the first signal.

In some embodiments, the apparatus comprises: means for buffering the first signal as the second adjustment signal according to a duration of the pulse. In some embodiments, the apparatus comprises: means for receiving the first signal from a first transmission media. In some embodiments, the apparatus comprises: means for receiving the second signal from a second transmission media of the bus, the second transmission media being separate from the first transmission media.

In another example, a system is provided which comprises: a memory; a processor coupled to the memory by a bus having first and second transmission lines to provide first and second signals respectively, the processor including a receiver which comprises an apparatus according to the apparatus described above; and a wireless interface for allowing the processor to communicate with another device. In some embodiments, the system further comprises a display interface for allowing a display unit to display content processed by the processor.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first buffer associated with a first receiver, the first buffer is to receive a first signal from a first transmission media;
a second buffer associated with a second receiver, the second buffer is to receive a second signal from a second transmission media separate from the first transmission media;
a first summing node coupled to the first buffer, the first summing node to receive output of the first buffer; and
a first digital adjustment circuit which is operable to drive a first adjustment signal to the first summing node when a transition edge of the second signal is detected.

2. The apparatus of claim 1, wherein the first buffer and the first digital adjustment circuit are to have substantially the same propagation delays.

3. The apparatus of claim 1, wherein the first digital adjustment circuit comprises:
a pulse generator to receive the second signal and to generate a pulse; and
a tri-stable buffer which is operable to buffer the second signal as the first adjustment signal according to a duration of the pulse.

4. The apparatus of claim 1 comprises:
a second summing node coupled to the second buffer, wherein the second summing node is to receive output of the second buffer.

5. The apparatus of claim 3, wherein the pulse generator has a programmable delay buffer.

6. The apparatus of claim 4 comprises:
a second digital adjustment circuit which is operable to drive a second adjustment signal to the second summing node when a transition edge of the first signal is detected.

7. The apparatus of claim 6, wherein the second buffer and the second digital adjustment circuit are to have substantially the same propagation delays.

8. The apparatus of claim 6, wherein the second digital adjustment circuit comprises:
a pulse generator to receive the first signal and to generate a pulse; and
a tri-stable buffer which is operable to buffer the first signal as the second adjustment signal according to a duration of the pulse.

9. The apparatus of claim 8, wherein the pulse generator has a programmable delay buffer.

10. The apparatus of claim 4 comprises:
a first capacitive device coupled to the first summing node; and
a second capacitive device coupled to the second summing node.

11. An apparatus comprising:
a bus to provide first and second signals; and
a pair of cross-coupled digital adjustment circuits which are operable to:
drive a first adjustment signal to a first summing node when a transition edge of the second signal is detected, and
drive a second adjustment signal to a second summing node when a transition edge of the first signal is detected.

12. The apparatus of claim 11, wherein one of the cross-coupled digital adjustment circuit comprises:
a pulse generator to receive the second signal and to generate a pulse; and
a tri-stable buffer which is operable to buffer the second signal as the first adjustment signal according to a duration of the pulse.

13. The apparatus of claim 11, wherein another of the cross-coupled digital adjustment circuit comprises:
a pulse generator to receive the first signal and to generate a pulse; and
a tri-stable buffer which is operable to buffer the first signal as the second adjustment signal according to a duration of the pulse.

14. The apparatus of claim 11 comprises:
a first buffer to receive the first signal from a first transmission media of the bus; and
a second buffer to receive a second signal from a second transmission media of the bus, wherein the second transmission media is separate from the first transmission media.

15. A system comprising:
a memory;
a processor coupled to the memory by a bus having first and second transmission lines to provide first and second signals, respectively, the processor including a receiver which comprises:
a pair of cross-coupled digital adjustment circuits which are operable to:
drive a first adjustment signal to a first summing node when a transition edge of the second signal is detected, and
drive a second adjustment signal to a second summing node when a transition edge of the first signal is detected; and
a wireless interface for allowing the processor to communicate with another device.

16. The system of claim 15, wherein the receiver is a Double Data Rate (DDR) compliant receiver.

17. The system of claim 15, wherein one of the cross-coupled digital adjustment circuit comprises:
a pulse generator to receive the second signal and to generate a pulse; and
a tri-stable buffer which is operable to buffer the second signal as the first adjustment signal according to a duration of the pulse.

18. The system of claim 17, wherein another of the cross-coupled digital adjustment circuit comprises:
a pulse generator to receive the first signal and to generate a pulse; and
a tri-stable buffer which is operable to buffer the first signal as the second adjustment signal according to a duration of the pulse.

19. The system of claim 15, wherein the receiver comprises:
a first buffer to receive the first signal from a first transmission media of the bus; and
a second buffer to receive a second signal from a second transmission media of the bus, wherein the second transmission media is separate from the first transmission media.

20. The system of claim 15 further comprises a display interface for allowing a display unit to display content processed by the processor.

* * * * *